Nov. 15, 1955

W. R. BLISS 2,724,055

COUPLING SYSTEM FOR HIGH FREQUENCIES

Filed Sept. 17, 1945

Inventor

W. RODERIC BLISS

By Ralph L Chappell

Attorney

United States Patent Office 2,724,055

Patented Nov. 15, 1955

2,724,055

COUPLING SYSTEM FOR HIGH FREQUENCIES

William Roderic Bliss, Washington, D. C.

Application September 17, 1945, Serial No. 616,949

2 Claims. (Cl. 250—36)

(Granted under Title 35, U. S. Code (1952), sec. 266)

This invention relates to coupling circuits and is particularly directed to a means for coupling to a resonant circuit at high frequencies.

It provides a means for supplying a constant amount of power to a load from an inductively tuned amplifier or oscillator circuit over a wide frequency range. This is accomplished by taking the output across a condenser connected in series with the elements of the tuned circuit, instead of coupling out inductively as is ordinarily done in high frequency applications.

When inductive coupling is used, it is necessary to adjust the secondary winding or pick-up loop as the frequency is changed in order to supply a constant output.

On the other hand, a voltage taken across a series condenser in the tuned circuit of an oscillator or amplifier tends to be constant through a wide frequency range since the voltage across a vacuum tube tends to be constant regardless of frequency for a given set of operating conditions. Since the circulating current in the tuned system varies directly with frequency, and the impedance of the condenser varies inversely with frequency, the voltage across the condenser tends to be constant regardless of frequency.

It is accordingly an object of the invention to provide condenser means of coupling to a load from an inductively tuned amplifier or oscillator circuit, which means supplies an output substantially independent of frequency.

It is another object of the invention to provide means of positive feedback in an oscillator circuit, substantially unaffected by frequency change.

The invention will be further understood with reference to the drawing in which.

Figure 1:
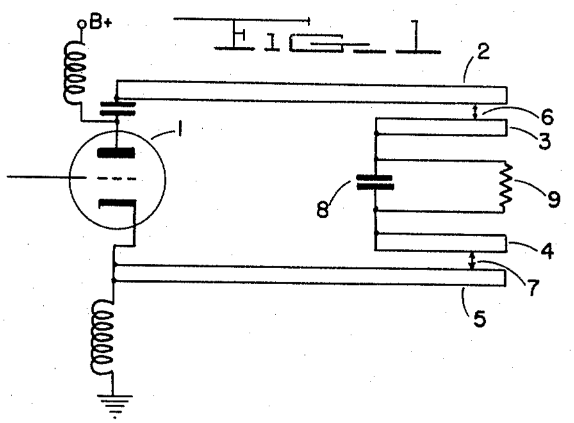
Fig. 1 is an exemplary embodiment of the invention in a high frequency amplifier.

In the amplifier in Fig. 1, the output to the load is taken across a condenser in series with the elements of the tuned circuit. This antiresonant circuit includes the plate to cathode capacitance of vacuum tube 1; the inductance of the open wire line composed of bars 2, 3, 4 and 5 and shorting bars 6 and 7; and the capacitance of condenser 8.

The capacitance of the open wire line is so small as to have negligible effect on the operation of the circuit.

The output is taken across the condenser 8 to the resistive load 9. The resistance of the load should be greater than the impedance of condenser 8 for best results.

In the circuit shown, the output is to a balanced load over a balanced line. It is feasible however to couple the output to a coaxial line with outer shield grounded. It is necessary only to ground the coaxial line at a sufficient distance from the condenser 8 that the inductance of the line from condenser 8 to ground is sufficient to prevent too much unbalance. If this arrangement permits too much loss, a "balun" or 2 wire bazooka may be used.

Figure 2:
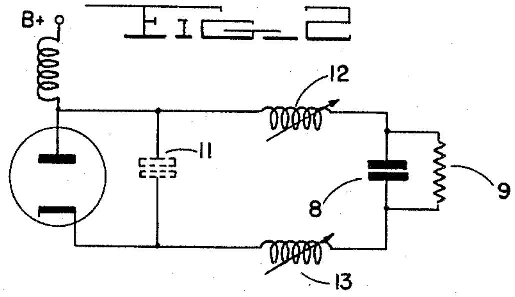
Fig. 2 is an equivalent circuit of Fig. 1.

Taking the output across the series condenser causes the power output to be substantially independent of frequency as can be seen from the equivalent circuit of Fig. 2. The interelectrode capacitance of the tube is represented by condenser 11, and the tuning inductance of the open wire line by coils 12 and 13. The load 9 is across the series condenser 8.

Within the frequency range for which a tube is designed, the voltage across it is substantially constant regardless of frequency for a given set of operating conditions. Thus we have a constant voltage applied across condenser 11. Since the impedance of condenser 11 varies inversely with frequency, the current through it will vary directly with frequency.

This current is the circulating current of the tuned circuit and is the current through condenser 8. Since the current through condenser 8 is then directly proportional to frequency and its impedance is inversely proportional to frequency the voltage developed across it is constant with frequency change. This can be seen from the usual equation $E_c = I_c X_c$ where $E_c$ is the voltage across the condenser, $I_c$ is the current through it, and $X_c$ is its reactance at the frequency used.

Figure 3:
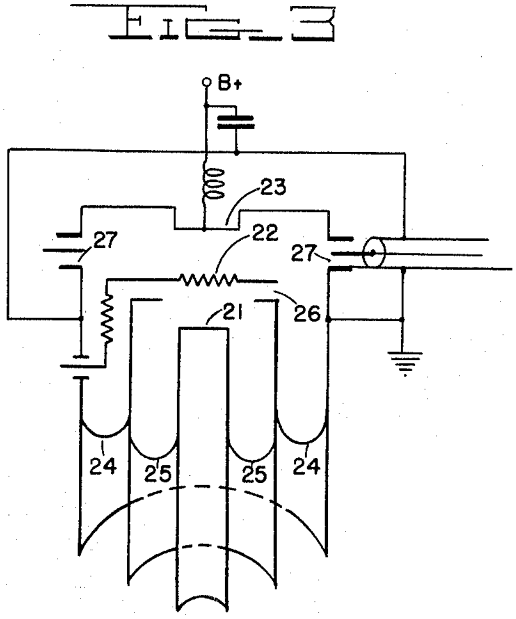
Fig. 3 is an exemplary embodiment of the invention in an oscillator.

The oscillator of Fig. 3 was designed to give a substantially constant output regardless of frequency. The positive feedback to the grid circuit is supplied across a condenser in series with the tuned plate circuit and the output is taken across another series condenser.

In the oscillator circuit, 21 is the cathode of a vacuum tube, 22 the grid, and 23 the plate. The circuit is tuned by pistons 24 and 25.

A constant voltage is fed back regardless of frequency by the series condenser 26 to support oscillations. Then a constant output is taken by coaxial cable to the load across the series condenser 27. The condensers 26 and 27 should be as close as possible to the tube electrodes in order to minimize the effect of changing circuit capacity due to change in tuning. An oscillator built utilizing the invention gave a very nearly constant output of 35 watts over a frequency range of 100 to 400 mc.

It will be understood that the specific embodiments described above are exemplary only, and that the scope of the invention will be determined with reference to the appended claims.

The invention described herein may be manufactured and used by or for the Government of the United States of America for governmental purposes without the payment of any royalties thereon or therefor.

What is claimed is:

1. A variable frequency oscillator with constant output comprising, a vacuum tube having at least anode, cathode, and control grid electrodes, an electrode terminal for each of said electrodes, a capacitor disposed at and connected to said anode electrode, a pair of series connected variable inductances connected in series with said capacitor between said anode and said cathode, feedback means connected between the junction of said inductances and said grid electrode, and a pair of output terminals connected across said capacitor.

2. A variable frequency oscillator with constant output comprising, a vacuum tube having anode, cathode, and control grid electrode terminals, three nested coaxial cylinders forming a pair of series connected variable inductances, corresponding ends of each of said cylinders being disposed in close proximity to said electrode terminals, a pair of annular capacitors mechanically and capacitively coupling the proximate ends of the middle and outer cylinders with their adjacent electrode terminals, the inner cylinder being connected to its adjacent electrode, one of said capacitors providing a feedback connection between said middle cylinder and the control grid electrode, and a pair of output terminals connected across said other capacitor.

References Cited in the file of this patent

UNITED STATES PATENTS

| | | |
|---|---|---|
| 1,831,640 | Roberts | Nov. 10, 1931 |
| 1,890,034 | Gebhard | Dec. 6, 1932 |
| 1,913,693 | Wheeler | June 13, 1933 |
| 2,007,875 | Roosenstein | July 9, 1935 |
| 2,177,843 | Seely | Oct. 31, 1939 |
| 2,264,879 | Heinecke | Dec. 2, 1941 |
| 2,384,504 | Thias | Sept. 11, 1945 |
| 2,395,928 | Willoughby | Mar. 5, 1946 |
| 2,406,364 | Friis et al. | Aug. 27, 1946 |
| 2,408,355 | Turner | Sept. 24, 1946 |
| 2,415,141 | Malling | Feb. 4, 1947 |
| 2,427,110 | Selby | Sept. 9, 1947 |
| 2,429,656 | Willoughby | Oct. 28, 1947 |
| 2,463,724 | Starner | Mar. 8, 1949 |
| 2,583,027 | Taylor | Jan. 22, 1952 |